United States Patent Office 3,503,824
Patented Mar. 31, 1970

3,503,824
ION LINKED COPOLYMER FOR EXTRUSION COATING
Richard David Nelson, Orange, Tex., assignor to E. I. du Pont de Nemours and Company, Wilmington, Del., a corporation of Delaware
No Drawing. Filed Apr. 19, 1967, Ser. No. 631,891
Int. Cl. C08f *3/34*
U.S. Cl. 156—244                                          1 Claim

ABSTRACT OF THE DISCLOSURE

An ion cross linked copolymer of alpha olefin and alpha,beta-ethylenically unsaturated carboxylic acid containing behenamide suitable for use as an extrusion coating resin.

---

This invention relates to an extrusion coating resin comprising ion cross linked copolymer and a chill roll release agent.

It is known to add various long chain hydrocarbon acid amides to polyolefin to modify the properties of products obtained from the resin. For example, palmitamide and lauramide are disclosed in Mock et al., U.S. Patent 2,938,879, as useful in films of ethylene to prevent block-in. Stearamide and ethylene-distearamide are disclosed in the Symonds U.S. Patent 2,770,609 for the same use. French Patent 1,132,791 discloses similar materials for the same use. It is also known to produce extrusion coatings on various substrates, for example, British Patent 688,637 discloses extruding molten polyethylene through a narrow slit die and then through nip rollers. In most instances the molten film contacts the substrate just prior to reaching the nip rollers. The nip roll which is contacted by the extruded polymer is maintained at a temperature less than the melting point of the extruder polymer, and thus is called a "chill" roll. In the usual operation, the rollers and the substrate are moving at a faster rate than the resin is extruding from the die resulting in a stretching or drawing of the resin being extruded. This results in the formation of a very thin coating on the surface of the substrate. Although this process is usually satisfactory when employed on polyethylene, and similar resins, it is unsatisfactory for ion cross linked copolymer, for this resin tends to adhere to the chill roller.

It would be highly desirable to be able to coat paper and other sheet-like materials with ion cross linked copolymer resin by extrusion techniques since the coating would be highly oil resistance. It would also be highly desirable to be able to coat paper and other similar materials with ionomer copolymer resin without substantial modification of the apparatus known in the art. It is the object of this invention to provide an ion cross linked resin that may be used in an extrusion coating operation without substantial modification of the process.

This object is accomplished according to the present invention by blending or normally solid ion cross linked resin with behenamide. The normally solid ion cross linked resin is made by neutralizing an alpha olefin/alpha, beta-ethylenically unsaturated carboxylic acid copolymer having a melt index of 2 to 2000 by the addition of metallic ions. The amount of metal ions should be sufficient to neutralize from 5 to 95% of the acid groups. Resins of this type and process of preparing them are disclosed in U.S. Patent 3,264,272. Particularly desirable resins for extrusion coatings are those obtained by polymerizing ethylene and methacrylic acid, containing 10 to 19 weight percent methacrylic acid, having a melt index of 8 to 2000 g./10 min. ASTM–D–1238–57T and neutralized with sodium, zinc or lithium to the extent of 5 to 95%.

Behenamide is added to the ion cross linked resin in the amount of 0.05 to 5.0% by weight, with 0.05 to 2.0%, and especially 0.1 to 0.5% being preferred. The exact reason that behenamide gives the ion cross linked resin the property of non-adherence to the chill roll while not adversely changing the adherence of the resin to the substrate is not fully understood, but it is believed that the behenamide is of sufficiently high molecular weight that it is entrapped within the polymer network and thus does not migrate to the surface of the molten resin in amounts sufficient to cause appreciable caking on the chill roll, and yet is sufficiently mobile within the polymer network that enough behenamide is present at the surface of the resin next to the chill roll to insure that the resin does not adhere to the chill roll.

In the following examples which illustrate the invention all parts and percentages are in parts by weight unless other wise specified.

EXAMPLE I

An ethylene-methacrylic acid copolymer containing 10 weight percent methacrylic acid having a melt index of 35 g./10 min., neutralized to a melt index of 1.5 g./10 min. (about 50% neutralized) with zinc ions was blended with 0.5% by weight behenamide. The resulting resin was then heated to 575° F. and extruded from a die having a slit-like aperture 20 mils wide and 10 inches long. The extruded material was then passed through nip rolls along with kraft paper. The chill roll was maintained at about 65° F. The kraft paper was moved at about 510 ft./min. Coating of less than about 0.5 mil thickness was obtained without difficulty using this normal coating procedure.

The same resin without the behenamide was extruded on to the same paper at the same conditions. This resin was unsatisfactory for the resin tightly stuck to and became wrapped around the chill roll.

EXAMPLE II

An ethylene/methacrylic acid copolymer containing 10 weight percent methacrylic acid having a melt index of about 35 was neutralized with sodium hydroxide. The melt index of the copolymer was reduced to about 1.2 g./10 min. (about 50% neutralization). Samples of the ion cross linked copolymer were then blended with varying amounts of behenamide and tested by extrusion coating kraft paper (web) under the conditions and with the results as shown in the following table.

| Percent Behenamide | Coating temp., °F. | Web speed,[1] ft./min. | Chill roll [2] sticking, cm. |
|---|---|---|---|
| 0 | 600 | 255 | 5 |
| 0 | 600 | 510 | 8 |
| 1 | 600 | 255 | 3 |
| 1 | 600 | 510 | 4 |
| 0.5 | 600 | 255 | 3 |
| 0.5 | 600 | 510 | 3 |
| 0.25 | 600 | 255 | 3 |
| 0.25 | 600 | 510 | 3 |
| 0.1 | 600 | 255 | 3 |
| 0.1 | 600 | 510 | 4 |
| 0 | 635 | 255 | 6 |
| 0 | 635 | 340 | 7 |
| 0 | 635 | 510 | 9 |
| 1 | 635 | 255 | 3 |
| 1 | 635 | 340 | 4 |
| 1 | 635 | 510 | 4 |
| 0.25 | 635 | 255 | 5 |
| 0.25 | 635 | 340 | 5 |
| 0.25 | 635 | 510 | 5 |
| 0.1 | 635 | 255 | 4 |
| 0.1 | 635 | 340 | 4.5 |
| 0.1 | 635 | 510 | 5 |
| 0.05 | 635 | 255 | 6 |
| 0.05 | 635 | 340 | 6 |
| 0.05 | 635 | 510 | 8 |

[1] A web speed of 255 ft./min. gives a .001-inch coating. A web speed of 340 ft./min. gives a .00075-inch coating. A web speed of 510 ft./min. gives a .0005-inch coating.

[2] Chill roll sticking cm., measures the distance in centimeters that a particular resin coated paper is pulled from the tangential take-off point on the chill roll by sticking to the roll. On the particular apparatus employed a measurement of 6 is considered poor, and a measurement of 10 would be on the verge of wrapping around the roll.

I claim:
1. In a process for extrusion coating of paper and the like with an ion cross linked copolymer of an alpha olefin and an alpha,beta-ethylenically unsaturated carboxylic acid in which said copolymer is cooled by contact with a chill roll which is maintained at a temperature less than the melting point of said copolymer, the improvement which comprises blending 0.05 to 5.0% by weight behenamide with the copolymer prior to beginning the coating step.

References Cited

UNITED STATES PATENTS

| | | | |
|---|---|---|---|
| 2,770,608 | 11/1956 | Barker | 260—32.6 |
| 2,770,609 | 11/1956 | Symonds | 260—32.6 |
| 2,880,862 | 4/1959 | Sermattei | 206—59 |
| 2,938,879 | 5/1960 | Mock | 260—32.6 |
| 3,282,727 | 11/1966 | Crone et al. | 117—68.5 |
| 3,264,272 | 8/1966 | Rees | 260—78.5 |
| 3,371,057 | 2/1968 | Guttman | 260—28.5 |
| 3,407,162 | 10/1968 | Rundle | 260—28.5 |

JOSEPH SCHOFER, Primary Examiner

J. C. HAIGHT, Assistant Examiner

U.S. Cl. X.R.

117—155; 260—88.1, 96; 264—171